US012724679B2

(12) United States Patent
Doddi et al.

(10) Patent No.: US 12,724,679 B2
(45) Date of Patent: Sep. 1, 2026

(54) SYSTEMS AND METHODS FOR AVOIDING RETRAINING A COMMUNICATION BUS AFTER A LINK FAILURE

(71) Applicant: QUALCOMM Incorporated, San Diego, CA (US)

(72) Inventors: Ravindranath Doddi, Hyderabad (IN); Ramacharan Sundararaman, San Jose, CA (US); Umamaheshwaran V, Salem (IN)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 19/046,649

(22) Filed: Feb. 6, 2025

(65) Prior Publication Data

US 2026/0228094 A1 Aug. 6, 2026

(51) Int. Cl.

*G06F 11/00* (2006.01)
*G06F 11/16* (2006.01)
*G06F 13/40* (2006.01)

(52) U.S. Cl.

CPC ...... *G06F 11/1625* (2013.01); *G06F 13/4027* (2013.01); *G06F 2201/86* (2013.01)

(58) Field of Classification Search

CPC ............ G06F 11/1625; G06F 13/4027; G06F 2201/86

See application file for complete search history.

(56) References Cited

U.S. PATENT DOCUMENTS

2007/0112984 A1* 5/2007 Ohara ................ G06F 13/4226 710/107
2020/0133355 A1* 4/2020 Bassman ............ G06F 13/1668
2023/0318701 A1* 10/2023 Hashemi ............ H04J 14/0307 398/5
2025/0199979 A1 6/2025 Akavaram et al.

* cited by examiner

*Primary Examiner* — Jason B Bryan
(74) *Attorney, Agent, or Firm* — Withrow & Terranova, PLLC

(57) ABSTRACT

Systems and methods for avoiding retraining a communication bus after a link failure are disclosed. In particular, in a communication bus that retrains a main band on failure of a sideband, aspects of the present disclosure contemplate using a redundant sideband to keep the bus active and avoid retraining the main band while the failed sideband is recovered. While particularly useful for a Universal Chiplet Interconnect express (UCIe) bus, aspects of the present disclosure may be applicable to other buses with similar sideband arrangements. By avoiding retraining the main band, communication between chiplets is not interrupted, thereby reducing latency for communication between chiplets and improving the user experience.

20 Claims, 11 Drawing Sheets

SYSTEMS AND METHODS FOR AVOIDING RETRAINING A COMMUNICATION BUS AFTER A LINK FAILURE

TECHNICAL FIELD

The technology of the disclosure relates generally to a communication bus and techniques to avoid retraining a main link after a sideband link failure.

BACKGROUND

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to pack more processing power into increasingly smaller spaces. To this end, various chip packaging formats have evolved including providing chiplets in a standard package format (e.g., two-dimensional, 2D) and, more recently, in an Advanced Package (e.g., 2.5D). Advanced packaging technology places chiplets in close proximity and may use, for example, a Universal Chiplet Interconnect express (UCIe) compliant communication bus to provide communication links between chiplets. The UCIe standard is published by the Institute for Electrics and Electronics Engineers (IEEE). Concurrently, there is pressure to provide reduced latency in the circuitry to improve the user experience. The intersection of the UCIe communication bus and the desire to reduce latency provides room for innovation.

SUMMARY

Aspects disclosed in the detailed description include systems and methods for avoiding retraining a communication bus after a link failure. In particular, in a communication bus that retrains a main band on failure of a sideband, aspects of the present disclosure contemplate using a redundant sideband to keep the bus active and avoid retraining the main band while the failed sideband is recovered. While particularly useful for a Universal Chiplet Interconnect express (UCIe) bus, aspects of the present disclosure may be applicable to other buses with similar sideband arrangements. By avoiding retraining the main band, communication between chiplets is not interrupted, thereby reducing latency for communication between chiplets and improving the user experience.

In this regard, in one aspect, a chiplet is disclosed. The chiplet includes a port configured to couple to a communication bus, a multiplexer coupled to the port and configured to route signals to a default sideband on the communication bus during normal operation and to a redundant sideband on the communication bus when a sideband fault occurs, and a control circuit coupled to the multiplexer. The control circuit is configured to detect the sideband fault on the default sideband, responsive to detection of the sideband fault, instruct the multiplexer to send signals to the redundant sideband, and while sending the signals to the redundant sideband, maintain operation of a main band of the communication bus.

In another aspect, a package is disclosed. The package includes a communication bus comprising a default sideband, a redundant sideband, and a main band, a first chiplet comprising a first port coupled to the communication bus, a first multiplexer coupled to the first port and configured to route signals to the default sideband on the communication bus during normal operation and to the redundant sideband on the communication bus when a sideband fault occurs, and a first control circuit coupled to the first multiplexer. The first control circuit configured to detect the sideband fault on the default sideband, responsive to detection of the sideband fault, instruct the first multiplexer to send signals to the redundant sideband, and while sending the signals to the redundant sideband, maintain operation of the main band of the communication bus. The package further includes a second chiplet comprising a second port coupled to the communication bus, and a second control circuit configured to responsive to receiving a signal on the redundant sideband, allow use of the redundant sideband while maintaining the operation of the main band.

In another aspect, a method of operating a communication bus is disclosed. The method includes detecting a fault on a default sideband link on the communication bus, responsive to detecting the fault, routing sideband signals on a redundant sideband link comprising lanes different than lanes used by the default sideband link, and maintaining operation of a main band link on the communication bus while using the redundant sideband link.

DETAILED DESCRIPTION

Figure 1:
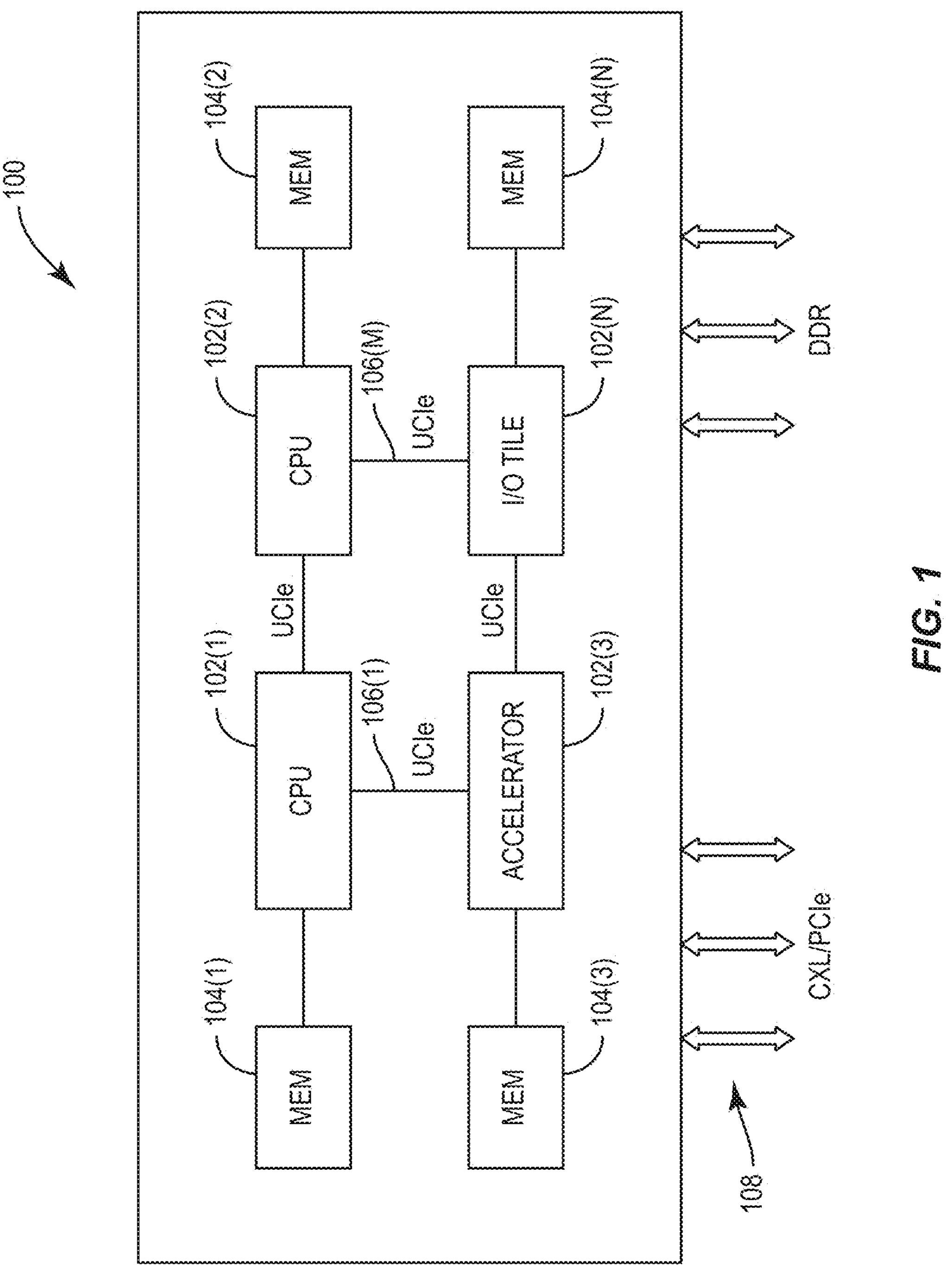
FIG. 1 is a block diagram of an exemplary package with multiple chiplets that communicate using a communication bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for avoiding retraining a communication bus after a link failure. In particular, in a communication bus that retrains a main band on failure of a sideband, aspects of the present disclosure contemplate using a redundant sideband to keep the bus active and avoid retraining the main band while the failed sideband is recovered. While particularly useful for a Universal Chiplet Interconnect express (UCIe) bus, aspects of the present disclosure may be applicable to other buses with similar sideband arrangements. By avoiding retraining the main band, communication between chiplets is not interrupted, thereby reducing latency for communication between chiplets and improving the user experience.

Before addressing aspects of the present disclosure, a brief overview of a package with chiplets having communication buses therebetween is described with reference to FIGS. 1-4. A discussion of the details of the present disclosure begins below with reference to FIG. 5.

In this regard, FIG. 1 is a block diagram of a package 100 that may include a plurality of chiplets 102(1)-102(N), where, as illustrated, N=4, although this is by way of example, and not intended to be limiting. The chiplets 102(1)-102(N) may each be a logical function such as a central processing unit (CPU), an accelerator, an input/output (I/O) tile, or the like. The chiplets 102(1)-102(N) may be coupled to respective memory elements 104(1)-104(N). Communication buses 106(1)-106(M) may exist between the chiplets 102(1)-102(N) allowing communication therebetween. For the purposes of explanation, it is assumed that the communication buses 106(1)-106(M) are UCIe buses. The package 100 may be integrated into a larger device as explained in greater detail below with reference to FIGS. 9 and 10 and, as such, may have external communication links 108 which may, for example, be compliant with compute express link (CXL), Peripheral Component Interconnect express (PCIe), or dual data rate (DDR) memory standards.

Figure 2:
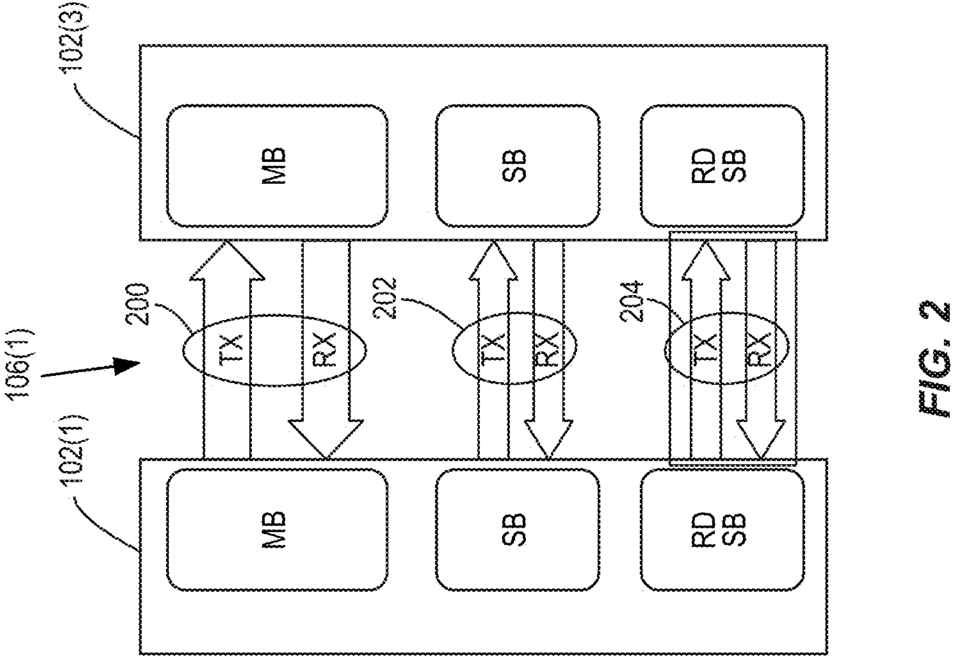
FIG. 2 is a block diagram of the links that may exist on a communication bus between two chiplets.

FIG. 2 provides additional details about the communication bus 106(1) between chiplets 102(1), 102(3). Specifically, there may be a main band (MB) link 200 with a plurality of lanes and channels (not shown explicitly, but typically sixty-four data lanes), a sideband (SB) link 202 with four data lanes typically (also not shown explicitly), and a redundant sideband (RD SB) link 204 with a clock and data lane typically (also not shown explicitly). In practice, during link establishment, all the sideband lanes are tested and active sideband lanes selected based on some criteria (e.g., fastest to turn on, lowest error rate, or the like) to form the sideband link 202. The remaining sideband lanes become the redundant sideband link 204. While not shown explicitly, it should be appreciated that there is a port in the chiplets 102(1)-102(N) that couples to the communication buses 106(1)-106(M). This port may be considered a communication bus interface.

Figure 3A:
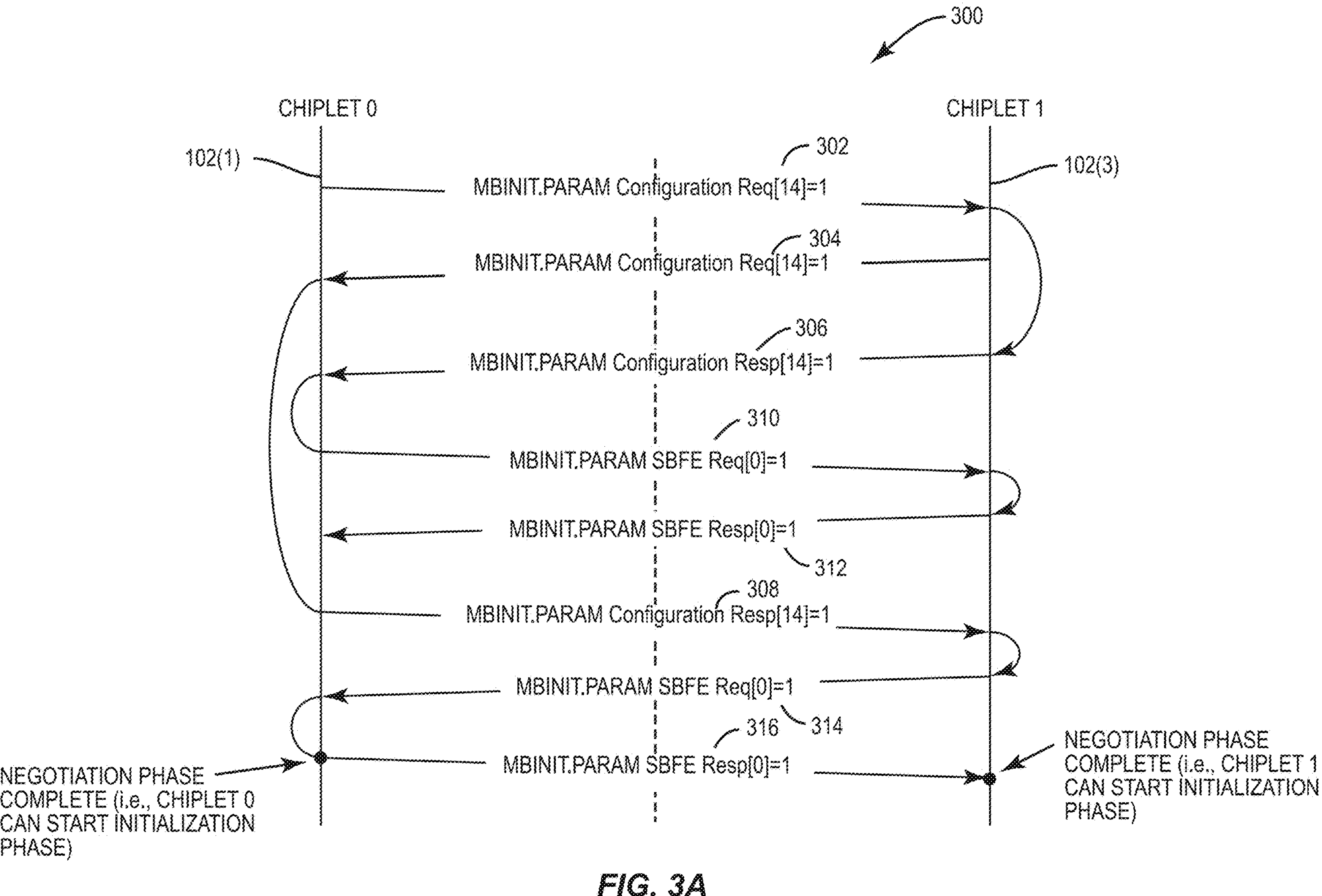
FIG. 3A is a signal path diagram of a negotiation phase used to establish communication between chiplets over the communication bus illustrated in FIG. 2.
Figure 3B:
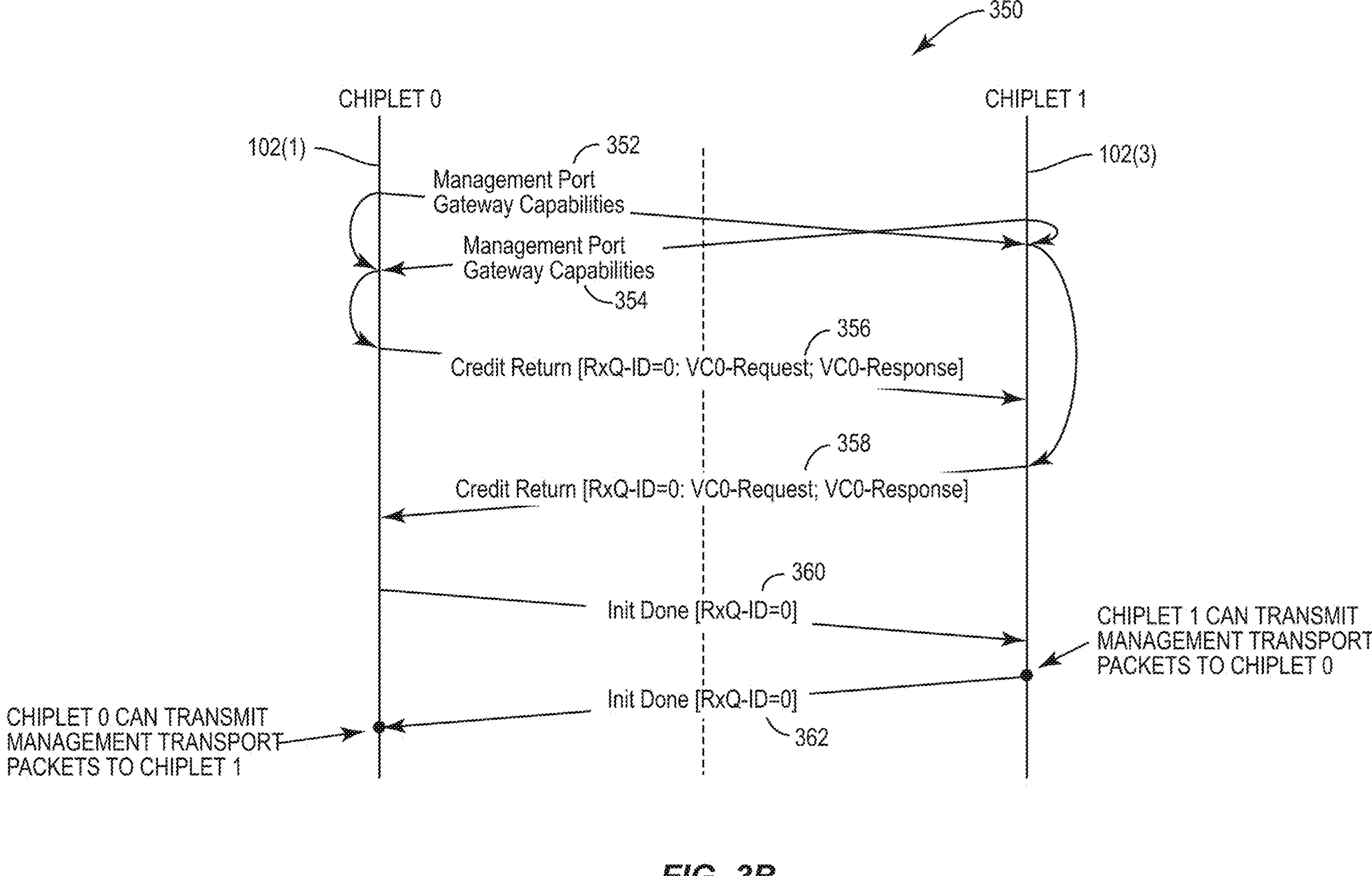
FIG. 3B is a signal path diagram of an initialization phase between chiplets over the communication bus illustrated in FIG. 2.

After lane designation for the links 202, 204, the communication bus 106(1) may go through a negotiation process 300 (illustrated in FIG. 3A) and an initialization process 350 (illustrated in FIG. 3B). The processes 300, 350 and the associated diagrams are pulled from the current IEEE version of the UCIe standard. The interested reader is directed thereto, but quickly summarized, a first chiplet 102(1) (also referred to as Chiplet 0 in FIG. 3A) sends a parameter configuration request 302. Concurrently, the chiplet 102(3) (also referred to as Chiplet 1 in FIG. 3A) sends a parameter configuration request 304. Responsive to the request 302, the chiplet 102(3) sends a parameter configuration response 306, and responsive to the request 304, the chiplet 102(1) sends a parameter configuration response 308. The chiplet 102(1) sends a sideband feature extension request 310 and gets a response 312. Similarly, the chiplet 102(3) sends a sideband feature extension request 314 and gets a response 316. The negotiation phase is then complete, and the initialization phase of FIG. 3B may begin.

The chiplets 102(1), 102(3) exchange management port gateway capability messages 352, 354 and then responsive to the messages 352, 354, credit return messages 356, 358 are sent. The chiplet 102(1) sends an initialization done message 360, and the chiplet 102(3) can now transmit management transport packets to the chiplet 102(1). The chiplet 102(3) also sends an initialization done message 362, and the chiplet 102(1) can now transmit management transport packets to the chiplet 102(3).

Normal operation of the communication bus 106(1) may then commence (and by extension other buses 106(1)-106(M) may operate after similar negotiation and initialization). It should be appreciated that as part of normal operation, the chiplets 102(1)-102(N) send heartbeat signals to one another over the communication buses 106(1)-106(M) and more particularly over the sideband link 202. By design, the UCIe standard allows for recovery in the event of a link failure.

More specifically, if the sideband link 202 experiences a heartbeat timeout or a sideband fatal error, there is a process referred to as a sideband retraining to reestablish the sideband link 202. However, any time there is a sideband retraining, the main band link 200 is also retrained. Retraining the main band link 200 disrupts signals passing across the respective communication bus 106(1)-106(M), which may add latency or otherwise delay the processing demands placed on the package 100. In some instances, this latency may degrade the user experience.

Figure 4:
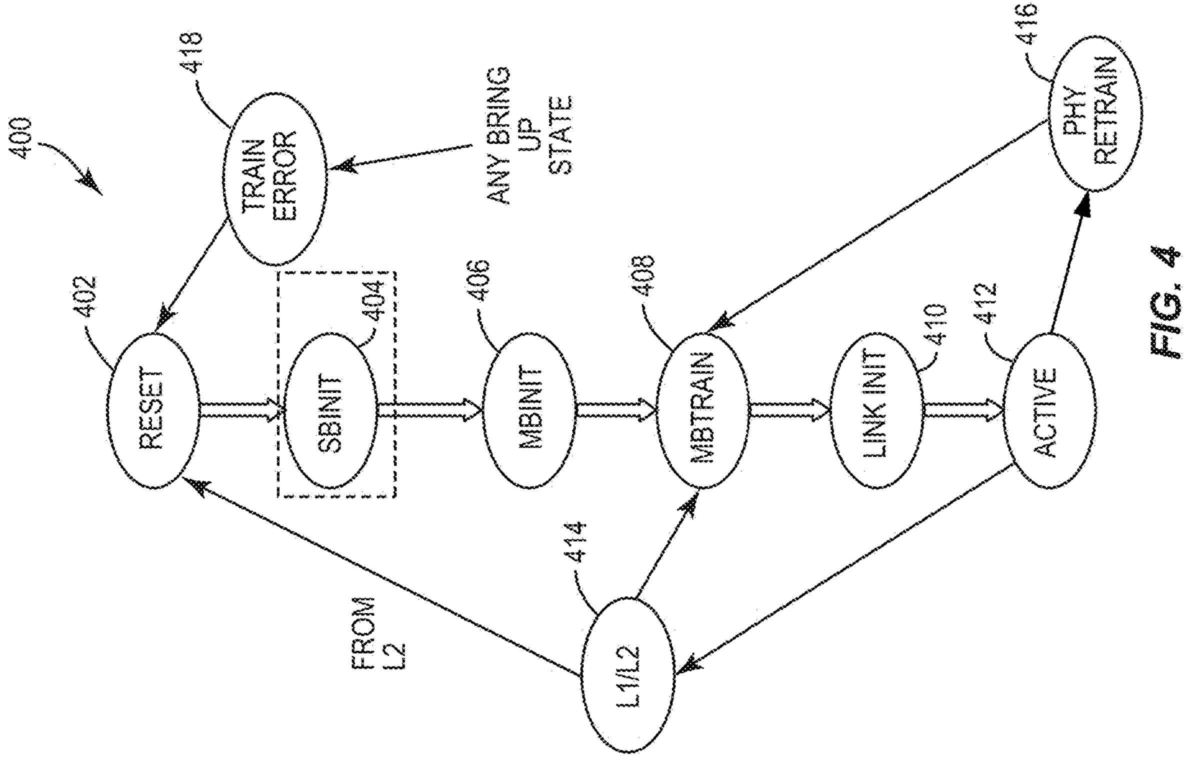
FIG. 4 is a flowchart of a conventional retraining process on sideband link failure for the communication bus of FIG. 2.

This process is illustrated as process 400 in FIG. 4. In particular, after a reset 402, a sideband initialization 404 (see FIG. 3A) is triggered. Responsive to the sideband initialization 404, a main band initialization 406 begins, where the main band is trained 408, a link is initialized 410, and the communication bus is returned to an active state 412. Note that the bus may also enter a low-power state (L1/L2) 414 in normal operation. Leaving the low-power state 414 may also trigger a reset 402. There may also be a physical layer (PHY) retrain sequence 416 that occurs from the active state 412. Such retrain sequence 416 does disrupt the main band by training the main band (state 408). However, this retrain sequence 416 is not of interest to the present disclosure. Note also that there may be a train error 418 in any "bring up state" that also triggers a full reset 402, but again this error is not of interest to the present disclosure.

Aspects of the present disclosure prevent the retraining of the main band link after a sideband link failure by shifting sideband duties to the redundant sideband link while the originally active sideband link is retrained. By preventing the retraining of the main band link during retraining of the sideband link, latency is avoided and the user experience is maintained at the intended levels.

Figure 5:
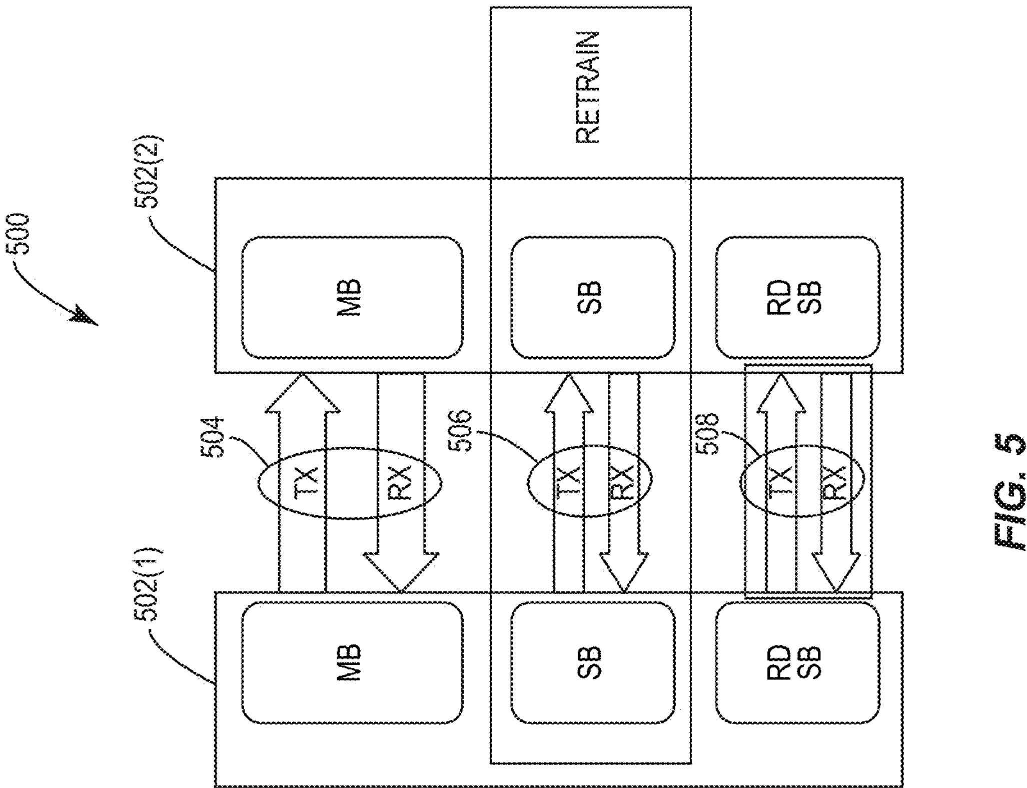
FIG. 5 is a block diagram of a communication bus between chiplets that utilizes a redundant sideband to avoid retraining a main band during sideband link failure.

Thus, as illustrated in FIG. 5, a package 500 may have chiplets 502(1), 502(2) connected by a bus having a main band link 504, a default sideband link 506, and a redundant sideband link 508. When the default sideband link 506 experiences a heartbeat timeout or a sideband fatal error, the default sideband link 506 is retrained in the background while the redundant sideband link 508 is taken out of tri-state and used as the active sideband lanes. As used herein, this ability to swap in the redundant sideband lanes is referred to as a resilient mode.

Figure 6:
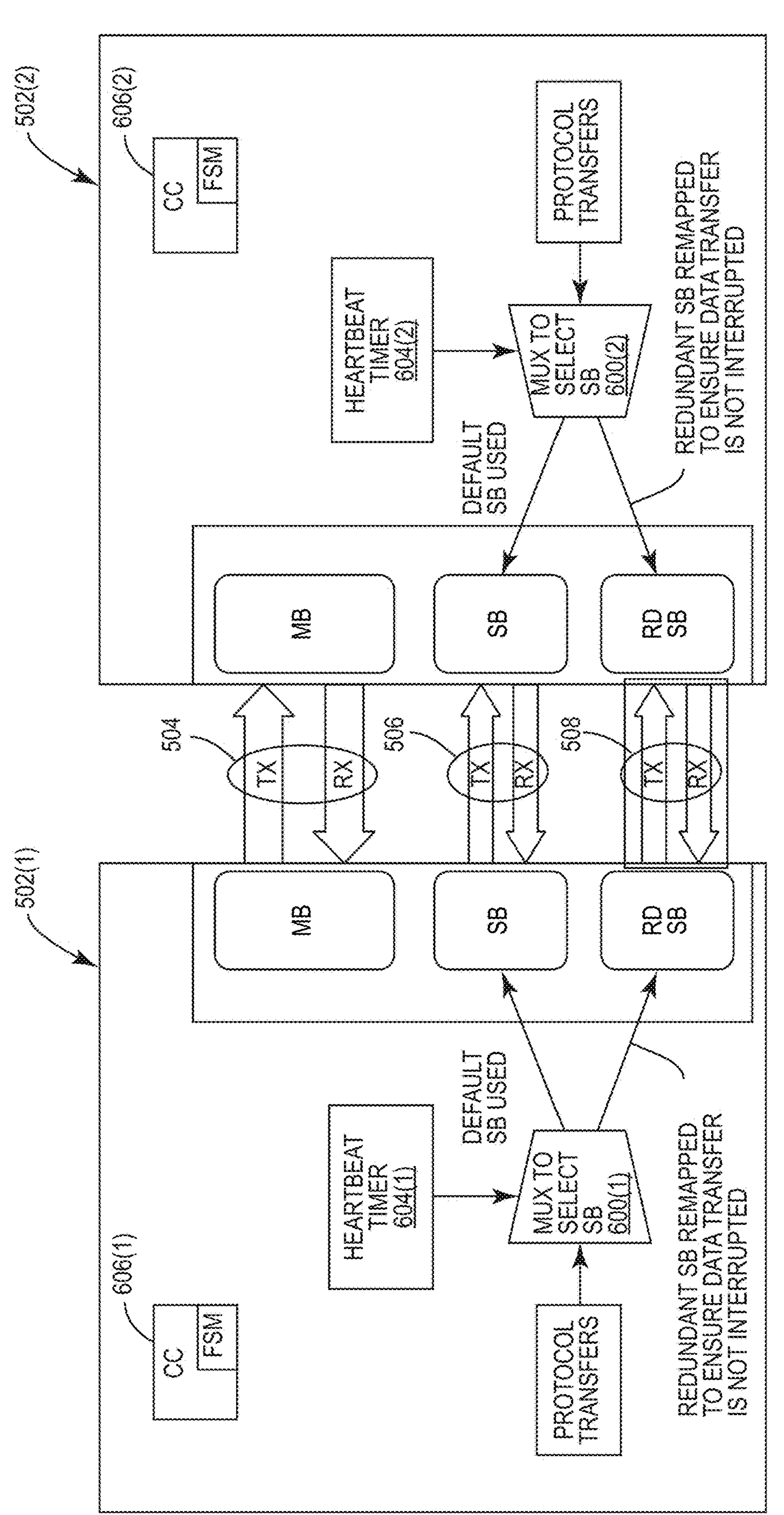
FIG. 6 is a block diagram of chiplets and a communication bus with a multiplexer added to allow use of the redundant sideband according to aspects of the present disclosure.

FIG. 6 illustrates additional details about the chiplets 502(1)-502(2). Specifically, a multiplexer 600(1)-600(2) is added to each chiplet 502(1)-502(2) to direct protocol transfers (and the heartbeat signal from heartbeat timers 604(1)-604(2)) to the appropriate sideband lanes through the port (still not shown explicitly). Additionally, each chiplet 502(1)-502(2) may include a respective control circuit 606(1)-606(2) (sometimes generically referred to herein as a control circuit 606) which may contain a finite state machine (FSM) that indicates a current state of links.

Figure 7:
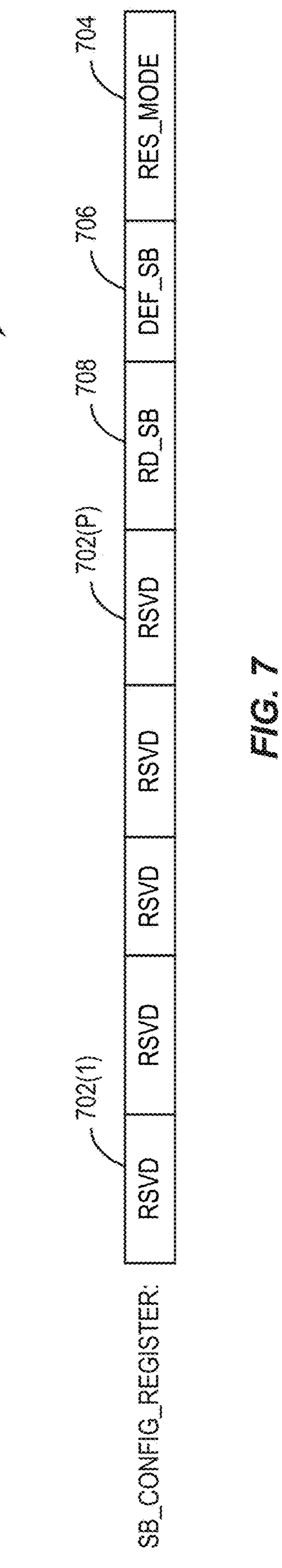
FIG. 7 is a block diagram of a register that may be used to indicate availability of link retraining avoidance according to aspects of the present disclosure.

Note that before this sideband switch is done, both sides of the communication bus may exchange information relating to the capability to perform this sort of link switch (e.g., embedded in messages 308, 310, 312, and 314) and may then be stored in an appropriate register such as a configuration register 700 illustrated in FIG. 7. The configuration register 700 may include reserved fields 702(1)-702(P). Additionally, there may be a field 704 that indicates that a resilient mode is enabled (i.e., the chiplet is capable of operating in a resilient mode). Field 706 may be set (e.g., changed from a zero to a one) to indicate that a default sideband is being used currently. The default sideband in this instance is the sideband lanes identified as the active sideband link during set up. Field 708 may be set (e.g., changed from a zero to a one) to indicate that the redundant sideband is being used currently as the active sideband (i.e., the default sideband has suffered some fault and has been taken out of use to retrain).

Figure 8:
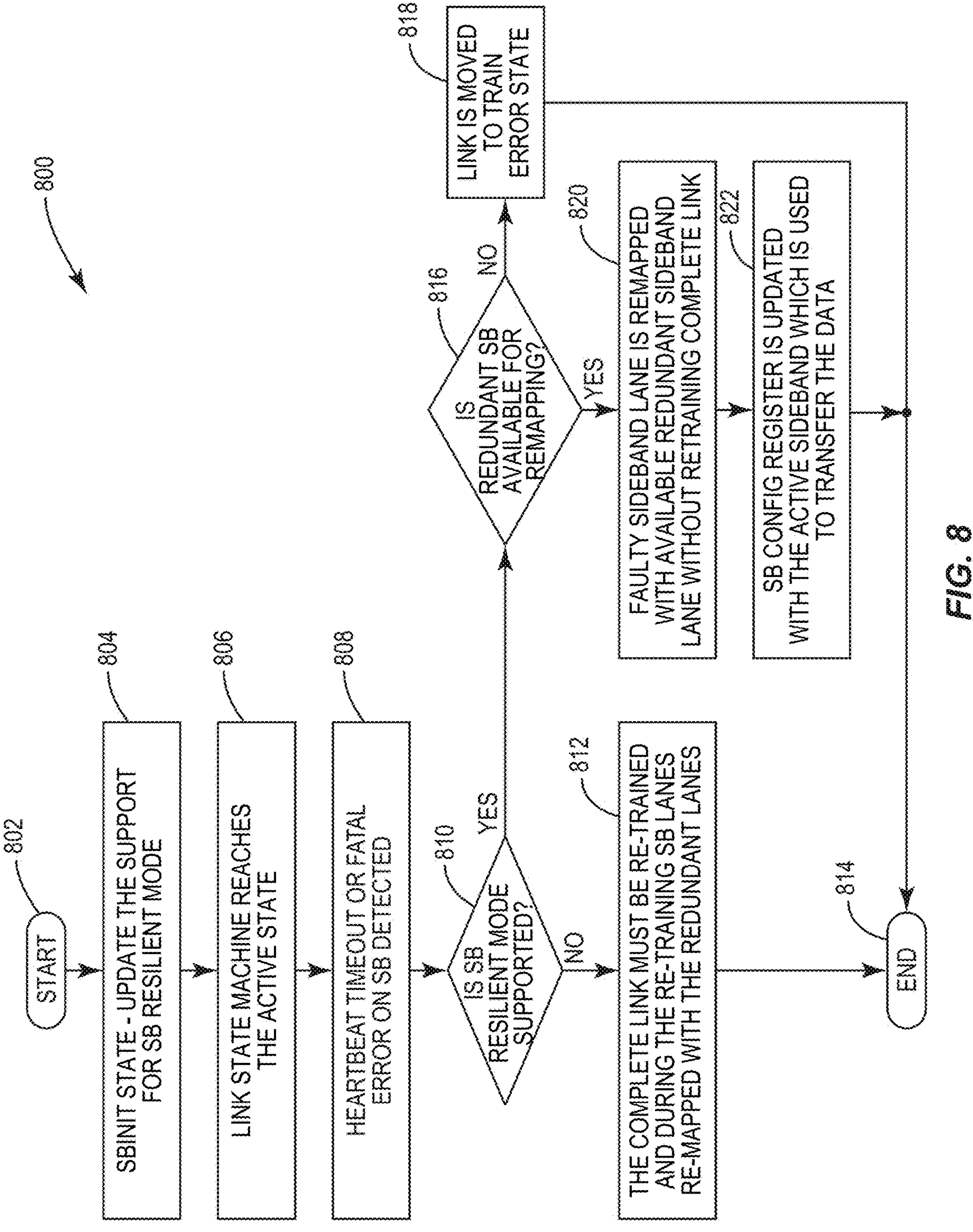
FIG. 8 is a flowchart of a process for avoiding link retraining on sideband failure according to aspects of the present disclosure.

While the above description sets forth the apparatus through which swapping sideband links is possible and intimates how such is done, a formal exemplary process 800 is provided with reference to FIG. 8. The process 800 starts (block 802) and the chiplets go through the initialization process to update the configuration register 700 to indicate support for the sideband resilient mode (block 804). The link state machine in the control circuit 606 reaches the active state (block 806). The active state continues until a heartbeat timeout or fatal error on the active sideband is detected (block 808). Generically, such an error is termed a sideband fault, and the term sideband fault also includes this and other uncorrectable errors. The control circuit 606 may verify that the sideband resilient mode is supported (block 810).

If the answer to block 810 is no, the resilient mode is not supported, then the complete link including the main link must be retrained and during the retraining the sideband lanes may be remapped with the redundant lanes (block 812) according to the existing rules within the UCIe protocol. The process 800 may then end (block 814).

If, however, the answer to block 810 is yes, the resilient mode is supported, the control circuit 606 may check to see if the redundant sideband is available for remapping (block 816). If the answer to block 816 is no, then the link is moved to a train error state (block 818) and the process 800 ends (block 814). If, however, the answer to block 816 is yes, then the faulty sideband is remapped with available redundant sideband lanes without retraining the complete link (block 820). The configuration register 700 is updated with the active sideband which is used to transfer the data (block 822) (i.e., the multiplexer 600(1), 600(2) is instructed to reroute the data to the new lanes or routing the sideband signals on the redundant sideband link that is formed from lanes different than the lanes used by the default sideband link) and the process 800 ends (block 814).

Electronic devices that include chiplets interconnected using communication buses that have redundant sidebands may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 9:
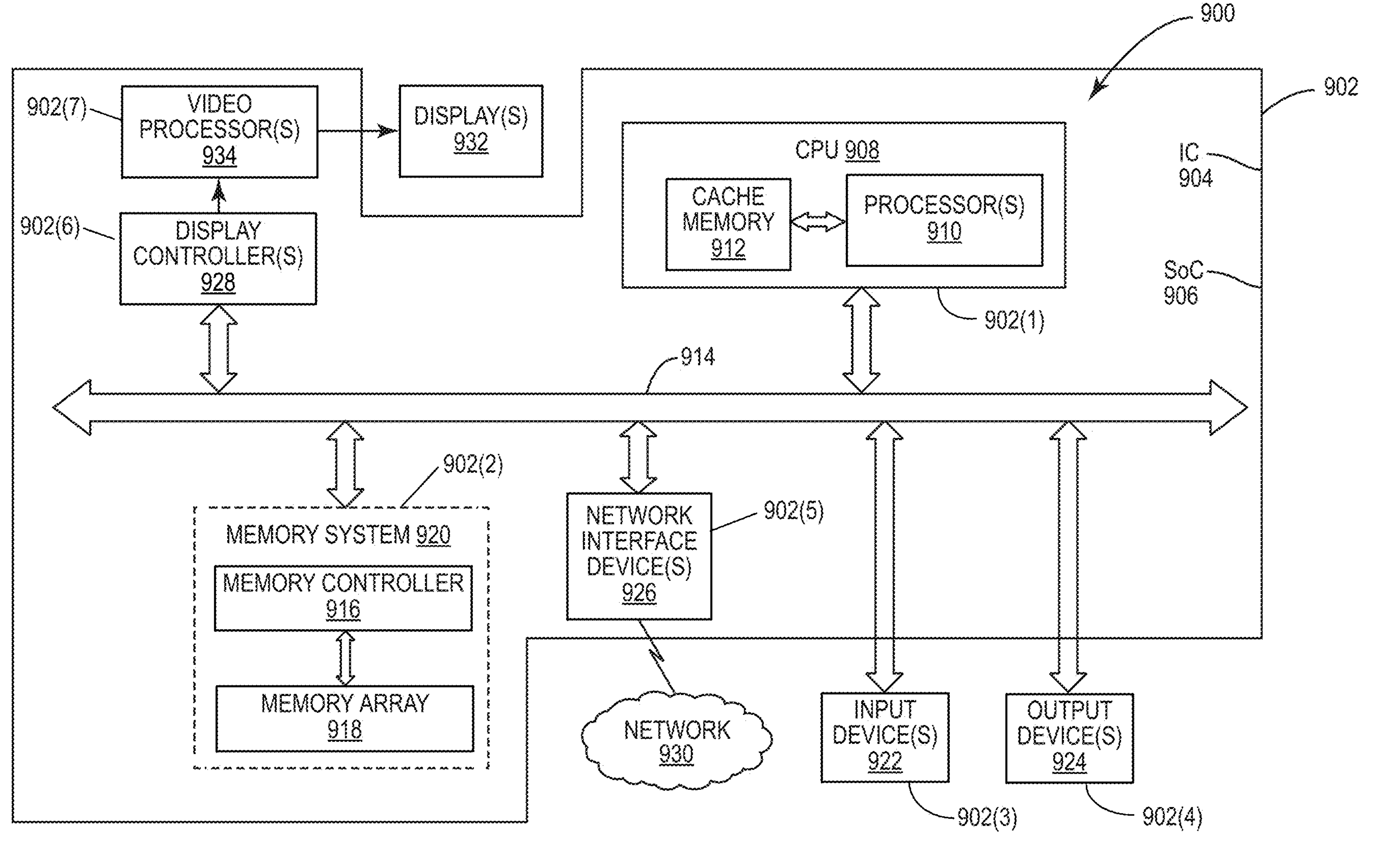
FIG. 9 is a block diagram of an exemplary processor-based system that can include a package with a communication bus implementing link retraining avoidance.

In this regard, FIG. 9 illustrates an example of a processor-based system 900 that can include packages that have chiplets using communication buses described above. In this example, the processor-based system 900 may be formed as an IC 904 in a device 902 (e.g., a mobile terminal, an automobile, a base station, or the like) and as a system-on-a-chip (SoC) 906. The processor-based system 900 includes a CPU 908 (which may be the package of the present disclosure) that includes one or more processors 910, which may also be referred to as CPU cores or processor cores. The CPU 908 may have cache memory 912 coupled to the CPU 908 for rapid access to temporarily stored data. The CPU 908 is coupled to a system bus 914 and can intercouple master and slave devices included in the processor-based system 900. As is well known, the CPU 908 communicates with these other devices by exchanging address, control, and data information over the system bus 914. For example, the CPU 908 can communicate bus transaction requests to a memory controller 916, as an example of a slave device. Although not illustrated in FIG. 9, multiple system buses 914 could be provided, wherein each system bus 914 constitutes a different fabric.

Other master and slave devices can be connected to the system bus 914. As illustrated in FIG. 9, these devices can include a memory system 920 that includes the memory controller 916 and a memory array(s) 918, one or more input devices 922, one or more output devices 924, one or more network interface devices 926, and one or more display controllers 928, as examples. Each of the memory system(s) 920, the one or more input devices 922, the one or more output devices 924, the one or more network interface devices 926, and the one or more display controllers 928 can be provided in the same or different electronic devices 902(2)-902(6). The input device(s) 922 can include any type of input device, including, but not limited to, input keys, switches, voice processors, etc. The output device(s) 924 can include any type of output device, including, but not limited to, audio, video, other visual indicators, etc. The network interface device(s) 926 can be any device configured to allow exchange of data to and from a network 930. The network 930 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 926 can be configured to support any type of communications protocol desired.

The CPU 908 may also be configured to access the display controller(s) 928 over the system bus 914 to control information sent to one or more displays 932. The display controller(s) 928 sends information to the display(s) 932 to be displayed via one or more video processor(s) 934, which process the information to be displayed into a format suitable for the display(s) 932. The display controller(s) 928 and video processor(s) 934 can be included as ICs in the same or different electronic devices 902(6), 902(7), and in the same or different electronic devices 902, 902(1) containing the CPU 908, as an example. The display(s) 932 can include any type of display, including, but not limited to, a cathode ray tube (CRT), a liquid crystal display (LCD), a plasma display, a light emitting diode (LED) display, etc.

Figure 10:
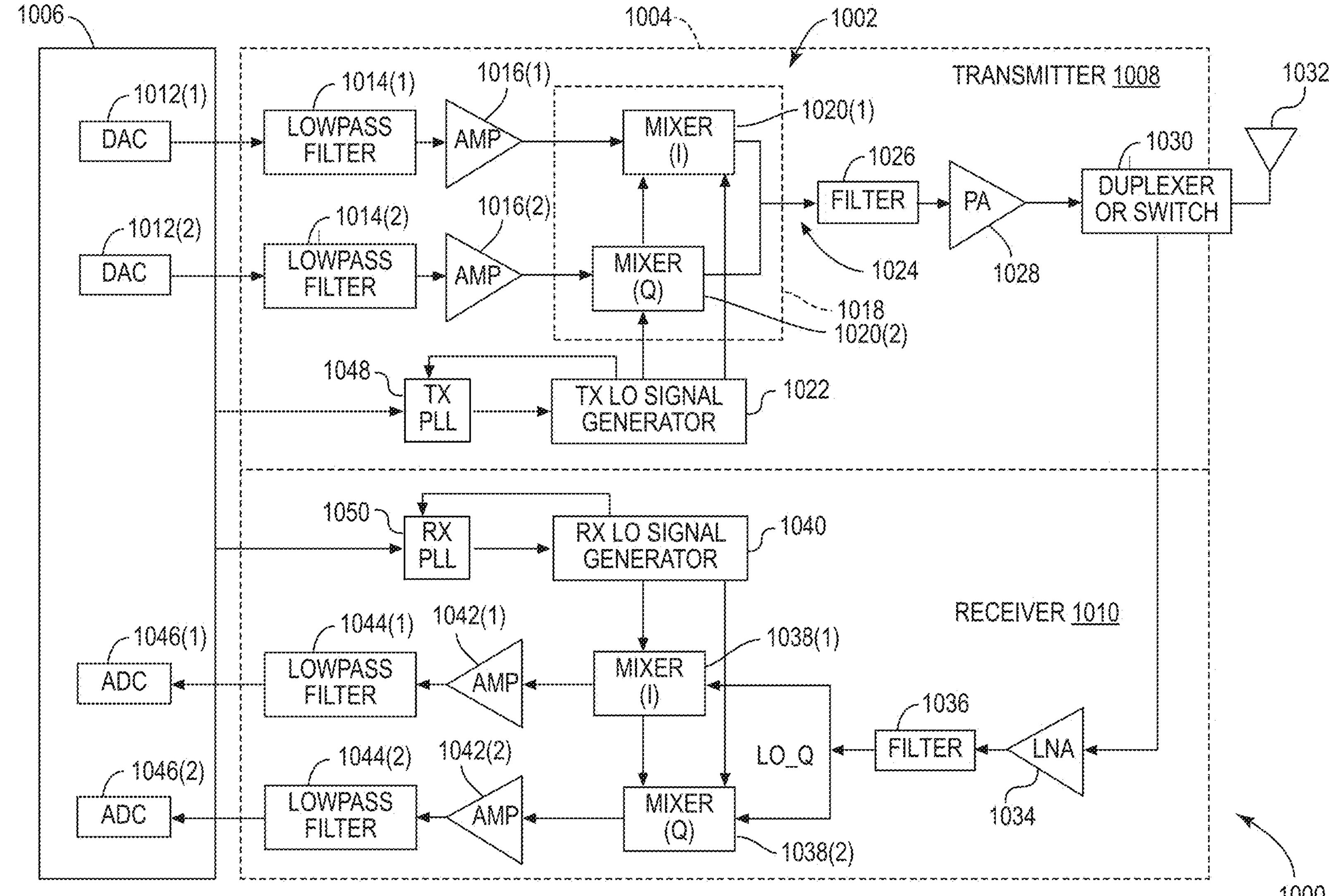
FIG. 10 is a block diagram of an exemplary wireless communication device that includes radio-frequency (RF) components that can include a package having chiplets that communicate according to aspects of the present disclosure.

FIG. 10 illustrates an exemplary wireless communications device 1000 that includes radio-frequency (RF) components formed from one or more ICs 1002, wherein any of the ICs 1002 can be the package having chiplets communicating according to aspects of the present disclosure. The wireless communications device 1000 may include or be provided in any of the above-referenced devices as examples. As shown in FIG. 10, the wireless communications device 1000 includes a transceiver 1004 and a data processor 1006. The data processor 1006 may include a memory to store data and program codes. The transceiver 1004 includes a transmitter 1008 and a receiver 1010 that support bi-directional communications. In general, the wireless communications device 1000 may include any number of transmitters 1008 and/or receivers 1010 for any number of communication systems and frequency bands. All or a portion of the transceiver 1004 may be implemented on one or more analog ICs, RF ICs (RFICs), mixed-signal ICs, etc.

The transmitter 1008 or the receiver 1010 may be implemented with a super-heterodyne architecture or a direct-conversion architecture. In the super-heterodyne architecture, a signal is frequency-converted between RF and baseband in multiple stages, for example, from RF to an intermediate frequency (IF) in one stage, and then from IF to baseband in another stage for the receiver 1010. In the direct-conversion architecture, a signal is frequency-converted between RF and baseband in one stage. The super-heterodyne and direct-conversion architectures may use different circuit blocks and/or have different requirements. In the wireless communications device 1000 in FIG. 10, the transmitter 1008 and the receiver 1010 are implemented with the direct-conversion architecture.

In the transmit path, the data processor 1006 processes data to be transmitted and provides I and Q analog output signals to the transmitter 1008. In the exemplary wireless communications device 1000, the data processor 1006 includes digital-to-analog converters (DACs) 1012(1), 1012(2) for converting digital signals generated by the data processor 1006 into the I and Q analog output signals (e.g., I and Q output currents) for further processing.

Within the transmitter 1008, lowpass filters 1014(1), 1014(2) filter the I and Q analog output signals, respectively, to remove undesired signals caused by the prior digital-to-analog conversion. Amplifiers (AMPs) 1016(1), 1016(2) amplify the signals from the lowpass filters 1014(1), 1014(2), respectively, and provide I and Q baseband signals. An upconverter 1018 upconverts the I and Q baseband signals with I and Q transmit (TX) local oscillator (LO) signals through mixers 1020(1), 1020(2) from a TX LO signal generator 1022 to provide an upconverted signal 1024. A filter 1026 filters the upconverted signal 1024 to remove undesired signals caused by the frequency up-conversion as well as noise in a receive frequency band. A power amplifier (PA) 1028 amplifies the upconverted signal 1024 from the filter 1026 to obtain the desired output power level and provides a transmit RF signal. The transmit RF signal is routed through a duplexer or switch 1030 and transmitted via an antenna 1032.

In the receive path, the antenna 1032 receives signals transmitted by base stations and provides a received RF signal, which is routed through the duplexer or switch 1030 and provided to a low noise amplifier (LNA) 1034. The duplexer or switch 1030 is designed to operate with a specific receive (RX)-to-TX duplexer frequency separation, such that RX signals are isolated from TX signals. The received RF signal is amplified by the LNA 1034 and filtered by a filter 1036 to obtain a desired RF input signal. Down-conversion mixers 1038(1), 1038(2) mix the output of the filter 1036 with I and Q RX LO signals (i.e., LO_I and LO_Q) from an RX LO signal generator 1040 to generate I and Q baseband signals. The I and Q baseband signals are amplified by AMPs 1042(1), 1042(2) and further filtered by lowpass filters 1044(1), 1044(2) to obtain I and Q analog input signals, which are provided to the data processor 1006. In this example, the data processor 1006 includes analog-to-digital converters (ADCs) 1046(1), 1046(2) for converting the analog input signals into digital signals to be further processed by the data processor 1006.

In the wireless communications device 1000 of FIG. 10, the TX LO signal generator 1022 generates the I and Q TX LO signals used for frequency up-conversion, while the RX LO signal generator 1040 generates the I and Q RX LO signals used for frequency down-conversion. Each LO signal is a periodic signal with a particular fundamental frequency. A TX phase-locked loop (PLL) circuit 1048 receives timing information from the data processor 1006 and generates a control signal used to adjust the frequency and/or phase of the TX LO signals from the TX LO signal generator 1022. Similarly, an RX PLL circuit 1050 receives timing information from the data processor 1006 and generates a control signal used to adjust the frequency and/or phase of the RX LO signals from the RX LO signal generator 1040.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Implementation examples are described in the following numbered clauses:

1. A chiplet comprising:

a port configured to couple to a communication bus;

a multiplexer coupled to the port and configured to route signals to a default sideband on the communication bus during normal operation and to a redundant sideband on the communication bus when a sideband fault occurs; and a control circuit coupled to the multiplexer, the control circuit configured to: detect the sideband fault on the default sideband;

responsive to detection of the sideband fault, instruct the multiplexer to send signals to the redundant sideband; and while sending the signals to the redundant sideband, maintain operation of a main band of the communication bus.

2. The chiplet of clause 1, wherein the port is configured to couple to a universal chiplet interconnect express (UCIe) communication bus.

3. The chiplet of clause 1 or clause 2, wherein the control circuit is configured to detect sideband faults including heartbeat timeouts, uncorrectable errors, and sideband fatal errors.

4. The chiplet of any clause 1 to clause 3, wherein the control circuit is configured to retrain the default sideband while maintaining the operation of the main band.

5. A package comprising:

a communication bus comprising a default sideband, a redundant sideband, and a main band;

a first chiplet comprising:

a first port coupled to the communication bus;

a first multiplexer coupled to the first port and configured to route signals to the default sideband on the communication bus during normal operation and to the redundant sideband on the communication bus when a sideband fault occurs; and a first control circuit coupled to the first multiplexer, the first control circuit configured to:

detect the sideband fault on the default sideband;

responsive to detection of the sideband fault, instruct the first multiplexer to send signals to the redundant sideband; and while sending the signals to the redundant sideband, maintain operation of the main band of the communication bus; and a second chiplet comprising:

a second port coupled to the communication bus; and a second control circuit configured to:

responsive to receiving a signal on the redundant sideband, allow use of the redundant sideband while maintaining the operation of the main band.

6. The package of clause 5, wherein the communication bus comprises a universal chiplet interconnect express (UCIe) communication bus.

7. The package of clause 5 or clause 6, wherein the first control circuit is configured to detect sideband faults including heartbeat timeouts, uncorrectable errors, and sideband fatal errors.

8. The package of any of clause 5 to clause 7, wherein the first control circuit is configured to retrain the default sideband while maintaining the operation of the main band.

9. The package of any of clause 5 to clause 8, wherein the second control circuit is further configured to detect the sideband fault.

10. The package of any of clause 5 to clause 9, wherein the second chiplet comprises a second multiplexer coupled to the second port.

11. The package of any of clause 5 to clause 10 integrated into a device selected from the group consisting of: a set-top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

12. A method of operating a communication bus comprising:

detecting a fault on a default sideband link on the communication bus;

responsive to detecting the fault, routing sideband signals on a redundant sideband link comprising lanes different than lanes used by the default sideband link; and maintaining operation of a main band link on the communication bus while using the redundant sideband link.

13. The method of clause 12, further comprising retraining the default sideband link while routing the sideband signals on the redundant sideband link.

14. The method of clause 12 or clause 13, wherein the communication bus comprises a universal chiplet interconnect express (UCIe) communication bus.

15. The method of any of clause 12 to clause 14, wherein detecting the fault comprises detecting a heartbeat timeout.

16. The method of any of clause 12 to clause 14, wherein detecting the fault comprises detecting an uncorrectable error.

17. The method of any of clause 12 to clause 14, wherein detecting the fault comprises detecting a sideband fatal error.

18. The method of any of clause 12 to clause 17, wherein routing the sideband signals comprises using a multiplexer.

19. The method of any of clause 12 to clause 18, further comprising providing a heartbeat signal for the communication bus.

20. The method of any of clause 12 to clause 14, further comprising providing signaling over the communication bus between chiplets within a package.

What is claimed is:

1. A chiplet comprising:

a port configured to couple to a communication bus;

a multiplexer coupled to the port and configured to route signals to a default sideband on the communication bus during normal operation and to a redundant sideband on the communication bus when a sideband fault occurs; and a control circuit coupled to the multiplexer, the control circuit configured to:

detect the sideband fault on the default sideband;

responsive to detection of the sideband fault, instruct the multiplexer to send signals to the redundant sideband; and while sending the signals to the redundant sideband, maintain operation of a main band of the communication bus.

2. The chiplet of claim 1, wherein the port is configured to couple to a universal chiplet interconnect express (UCIe) communication bus.

3. The chiplet of claim 1, wherein the control circuit is configured to detect sideband faults, including heartbeat timeouts, uncorrectable errors, and sideband fatal errors.

4. The chiplet of claim 1, wherein the control circuit is configured to retrain the default sideband while maintaining the operation of the main band.

5. A package comprising:

a communication bus comprising a default sideband, a redundant sideband, and a main band;

a first chiplet comprising:

a first port coupled to the communication bus;

a first multiplexer coupled to the first port and configured to route signals to the default sideband on the communication bus during normal operation and to the redundant sideband on the communication bus when a sideband fault occurs; and a first control circuit coupled to the first multiplexer, the first control circuit configured to:

detect the sideband fault on the default sideband;

responsive to detection of the sideband fault, instruct the first multiplexer to send signals to the redundant sideband; and while sending the signals to the redundant sideband, maintain operation of the main band of the communication bus; and a second chiplet comprising:

a second port coupled to the communication bus; and a second control circuit configured to:

responsive to receiving a signal on the redundant sideband, allow use of the redundant sideband while maintaining the operation of the main band.

6. The package of claim 5, wherein the communication bus comprises a universal chiplet interconnect express (UCIe) communication bus.

7. The package of claim 5, wherein the first control circuit is configured to detect sideband faults, including heartbeat timeouts, uncorrectable errors, and sideband fatal errors.

8. The package of claim 5, wherein the first control circuit is configured to retrain the default sideband while maintaining the operation of the main band.

9. The package of claim 5, wherein the second control circuit is further configured to detect the sideband fault.

10. The package of claim 5, wherein the second chiplet comprises a second multiplexer coupled to the second port.

11. The package of claim 5 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

12. A method of operating a communication bus comprising:

detecting a fault on a default sideband link on the communication bus;

responsive to detecting the fault, routing sideband signals on a redundant sideband link comprising lanes different than lanes used by the default sideband link; and maintaining operation of a main band link on the communication bus while using the redundant sideband link.

13. The method of claim 12, further comprising retraining the default sideband link while routing the sideband signals on the redundant sideband link.

14. The method of claim 12, wherein the communication bus comprises a universal chiplet interconnect express (UCIe) communication bus.

15. The method of claim 12, wherein detecting the fault comprises detecting a heartbeat timeout.

16. The method of claim 12, wherein detecting the fault comprises detecting an uncorrectable error.

17. The method of claim 12, wherein detecting the fault comprises detecting a sideband fatal error.

18. The method of claim 12, wherein routing the sideband signals comprises using a multiplexer.

19. The method of claim 12, further comprising providing a heartbeat signal for the communication bus.

20. The method of claim 12, further comprising providing signaling over the communication bus between chiplets within a package.

* * * * *